United States Patent
Cai et al.

(10) Patent No.: US 10,635,929 B2
(45) Date of Patent: Apr. 28, 2020

(54) SALIENCY-BASED METHOD FOR EXTRACTING ROAD TARGET FROM NIGHT VISION INFRARED IMAGE

(71) Applicant: JIANGSU UNIVERSITY, Zhenjiang (CN)

(72) Inventors: Yingfeng Cai, Zhenjiang (CN); Lei Dai, Zhenjiang (CN); Hai Wang, Zhenjiang (CN); Xiaoqiang Sun, Zhenjiang (CN); Long Chen, Zhenjiang (CN); Haobin Jiang, Zhenjiang (CN); Xiaobo Chen, Zhenjiang (CN); Youguo He, Zhenjiang (CN)

(73) Assignee: JIANGSU UNIVERSITY, Zhenjiang, Jiangsu (CN)

( * ) Notice: Subject to any disclaimer, the term of this patent is extended or adjusted under 35 U.S.C. 154(b) by 185 days.

(21) Appl. No.: 16/070,078

(22) PCT Filed: Jun. 8, 2017

(86) PCT No.: PCT/CN2017/087531
§ 371 (c)(1),
(2) Date: Jul. 13, 2018

(87) PCT Pub. No.: WO2018/024030
PCT Pub. Date: Feb. 8, 2018

(65) Prior Publication Data
US 2019/0197344 A1 Jun. 27, 2019

(30) Foreign Application Priority Data
Aug. 3, 2016 (CN) .......................... 2016 1 0631619

(51) Int. Cl.
*H04N 5/228* (2006.01)
*G06K 9/00* (2006.01)
(Continued)

(52) U.S. Cl.
CPC ....... *G06K 9/4676* (2013.01); *G06K 9/00791* (2013.01); *G06K 9/00798* (2013.01);
(Continued)

(58) Field of Classification Search
USPC ........ 382/100, 103–104, 106–107, 155, 162, 382/168, 173, 181, 190, 199, 219, 224,
(Continued)

(56) References Cited

U.S. PATENT DOCUMENTS 9,317,759 B2 * 4/2016 Inada .................... B60K 35/00
2014/0063275 A1 * 3/2014 Krahenbuhl ......... H04N 19/117
348/208.4
(Continued)

FOREIGN PATENT DOCUMENTS

CN 102521592 A 6/2012
CN 102999926 A 3/2013
(Continued)

OTHER PUBLICATIONS

International Search Report for PCT/CN2017/087531, dated Aug. 24, 2017.
(Continued)

*Primary Examiner* — Seyed H Azarian
(74) *Attorney, Agent, or Firm* — Heslin Rothenberg Farley & Mesiti, P.C.

(57) ABSTRACT

The present invention belongs to the field of machine vision. A saliency-based method for extracting a road target from a night vision infrared image is disclosed. The method combines saliencies of the time domain and the frequency domain, global contrast and local contrast, and low level features and high level features, and energy radiation is also considered to be a saliency factor; thus, the object of processing is an infrared image and not the usual natural image. The extraction of a salient region is performed on the
(Continued)

raw natural image on the basis of energy radiation, and the obtained extraction result if the salient region is more accurate and thorough, and the contour of a target in the salient region is clearer.

7 Claims, 3 Drawing Sheets

(51) Int. Cl.
  *G06K 9/46* (2006.01)
  *G06K 9/52* (2006.01)
  *G06T 7/11* (2017.01)
(52) U.S. Cl.
  CPC .............. *G06K 9/522* (2013.01); *G06T 7/11* (2017.01); *G06T 2207/30256* (2013.01)
(58) Field of Classification Search
  USPC ....... 382/232, 254, 260, 276, 286–291, 305, 382/312; 348/208.4
  See application file for complete search history.

(56) References Cited

U.S. PATENT DOCUMENTS

| | | | |
|---|---|---|---|
| 2015/0010207 A1* | 1/2015 | Inada | B60K 35/00 382/103 |
| 2015/0227810 A1* | 8/2015 | Perazzi | H04N 19/117 382/107 |
| 2016/0004929 A1* | 1/2016 | Varghese | G06K 9/00771 382/103 |
| 2017/0372162 A1* | 12/2017 | Wang | G06K 9/4604 |

FOREIGN PATENT DOCUMENTS

| | | |
|---|---|---|
| CN | 103020993 A | 4/2013 |
| CN | 104463855 A | 3/2015 |
| CN | 104463907 A | 3/2015 |
| CN | 106295542 A | 1/2017 |

OTHER PUBLICATIONS

Chao Ji et al., "Image Salient Region Detection Based on Spatial and Frequency Domains," Journal of Jilin University Engineering and Technology Edition, vol. 44, No. 1, Jan. 31, 2014.

* cited by examiner

SALIENCY-BASED METHOD FOR EXTRACTING ROAD TARGET FROM NIGHT VISION INFRARED IMAGE

CROSS REFERENCE TO RELATED APPLICATIONS

This application is a U.S. National Phase filing under 35 U.S.C. § 371 of International Application PCT/CN2017/087531, filed Jun. 8, 2017, and published as WO2018/024030 A1 on Feb. 8, 2018. PCT/CN2017/087531 claims priority from Chinese Patent Application Number 201610631619.1, filed Aug. 3, 2016. The entire contents of each of these applications are hereby expressly incorporated herein by reference.

TECHNICAL FIELD

The invention relates to machine visual attention, which is used for the extraction and identification of road targets at night, especially the extraction method of visual salient targets in the infrared image of night vision.

TECHNICAL BACKGROUND

The visual salient mechanism can be used to extract the salient areas of significant object which may have influence on traffic safety in complex road. For traditional object detection method in complex road scenes, the related algorithm is very complex, then the data processing capacity of the computer will be very large and the processing efficiency will be very low. Nowadays, the researchers are inspired by the visual attention mechanism in the human visual system, hoping that machine vision would first screen the raw input data like the human visual system. Therefore, the visual salient model of machine vision is proposed to reduce computation and improve its efficiency.

Visual saliency is a concept of neurophysiology and psychology. Many neurophysiologists and psychologists have put forward a lot of models to explain the saliency mechanism of the human visual system, such as the peripheral central nervous system, which simulates the ability of efficient data screening in human visual attention mechanism. Inspired by this, researchers in various countries have launched extensive and in-depth research on how to screen data in machine vision like human visual saliency mechanism.

Chinese invention (CN102999926A) disclosed is an image visual saliency calculation method based on low-level feature fusion which fuse underlying features such as colors, textures, etc. to obtain a significant area. This invention just based on low-level features while ignore high-level features so that its saliency extraction is inaccurate. Chinese invention (CN103020993A) disclosed a dual-channel color contrast fusion visual saliency detection method which use the superpixel method to calculate the value of color saliency to obtain a saliency image based on color features. This invention only processes in the time domain, and is based only on color characteristics, ignoring the significance in the frequency domain, so the extraction of the significance area is not complete. The above method has its own deficiencies in the process of extracting the salient regions, and deals with a natural and natural image without considering that the night vision infrared image corresponding to the natural image can be processed. Therefore, in the night road scenario, their detection rate is low, and are easily disturbed by the light in the background environment, and the outline of the prominent target is not clear enough.

By processing the corresponding night vision infrared images of the original image, the present invention tend to avoid the influence of the light in the non-visible background of the original image at night, so as to improve the accuracy of the salient target extraction in the night road scene.

The Content of Invention

In view of the existing visual attention models, the accuracy of target detection in night road scenes is low, which is easily influenced by the non-salient regions in the night road scenes and the lights in the non-salient regions, and the salient contours are not clear. Focus on the shortage of existing technology, the invention provides a road target extraction method based on the saliency in the night vision infrared image.

The invention provides a road target extraction method based on the saliency in the night vision infrared image, which is realized by the following technical scheme:

A road target extraction method based on the saliency in the night vision infrared image, including the following steps:

S1, For night vision infrared image, we use the Graph-Based Visual Saliency ("GBVS") model to extract the salient region based on local features to salient image CC after rough extraction;

S2, Based on the method of spectral scale space in a hypercomplex frequency domain, extracting the salient region meticulously of salient image CC to get the salient image ZZ of night vision infrared image in the global feature;

S3, Fuse the global and local cues to get the salient image AA.

Further, the steps of applying the method of spectral scale space of using the hypercomplex frequency domain to extract the salient regions meticulously of the saliency image CC as described in S2 is as follows:

S2.1, By calculating the three components in red, green and blue channels of saliency image, three characteristic maps U,RG,BY of saliency image are obtained;

S2.2, Integrate the feature map U,RG,BY and gain the hypercomplex matrix f(x,y);

S2.3, Carry out the hypercomplex Fourier transformation to the hypercomplex matrix f(x,y), and calculating the amplitude spectrum A, phase spectrum p, and feature spectrum kk;

S2.4, the amplitude spectrum A obtained is convoluted, thus the spectral scale space $\{AA_k\}$ is obtained;

S2.5, Compute saliency map sequence $\{Z_i\}$ on the spectral scale space $\{AA_k\}$.

S2.6, Select one of saliency image ZZ from saliency map sequence $\{Z_i\}$ based on the principle of maximum variance.

Further, the steps of using the saliency extraction method based on the fusion of global and local cues to integrate the global and local cues of the saliency image ZZ, and getting the saliency image AA is as follows:

S3.1, Saliency image is divided into several small image regions based on the super pixel segmentation;

S3.2, For the multiple small image regions, the global contrast is used to obtain the salient image in the low level model of the saliency image ZZ;

S3.3, According to the salient image ZZ in the low level model, we get the coding dictionary BC of the background and the coding dictionary FC of the salient target in the high-level model based on the threshold segmentation method;

S3.4, Calculate the saliency image of background and the saliency image $p_g(w_i)$ of salient target in high-level model of the saliency image ZZ;

S3.5, Combine the saliency image of background and the saliency image of the salient target to get the saliency image of the high level model;

S3.6, Fuse the saliency image of the low level model and the saliency image of the high level model to get the final saliency image AA.

Further, the formula of the hypercomplex matrix f(x,y) described in S2.2 is f(x,y)=0.5×U $\vec{i}$+0.25×RG $\vec{j}$+0.25BY $\vec{k}$, Where vectors $\vec{i}$, $\vec{j}$, $\vec{k}$ are unit vectors in the three dimensional space coordinate system with the same direction as x, y, z.

Further, the formula of the amplitude spectrum A described in S2.3 is A=|F(f(x,y))|, Where: |•| is calculating the amplitude, F( ) is hypercomplex Fourier transformation.

Further, the formula of saliency map sequence $\{Z_i\}$ described in S2.5 is $Z_i = g * |F^{-1}\{AA_k(x,y)e^{kk \times p(x,y)}\}|^2$, phase spectrum is p=φ(F(f(x,y))), feature spectrum is $$kk = \frac{v(F(f(x, y)))}{\|v(F(f(x, y)))\|},$$

Among them, |•| is solving amplitude, F( ) is hypercomplex Fourier transformation, φ( ) is phase, v( ) is taking the vector part of the Fourier transformation, ||•|| is modulus of vector, g is Gaussian kernel, *is convolution, X is product, $F^{-1}$ is Fourier inversion.

Further, principle in threshold segmentation of coding dictionary BC of the background and the coding dictionary FC of the salient target in the high-level model described in S3.3 is BC=$w_i$ (if $P_d(w_i)<\lambda_1$), FC=$w_i$ (if $P_d(w_i)>\lambda_2$) wherein $\lambda_1$ represents the threshold selected in the background encoding; and $\lambda_2$ is threshold value chosen for the encoding of a salient target.

Further, The calculation process to get the saliency image of background and the saliency image of salient target in high-level model of the saliency image ZZ is as follows: the equilibrium coefficient μ between punitive consideration and regularization is selected randomly by computer to satisfy the following formula $$\min\left(\sum_{i=1}^{n} \|U_i - Dbb_i\|^2 + \mu \|dd_{w_i} \circ bb_i\|^2\right), \text{ where,}$$

$$bb_i = \frac{1}{cc_i + \lambda \times tr(cc_i)},$$

$$dd_{w_i} = \exp\left(\frac{[dist(U_i, H_1), dist(U_i, H_2) \ldots dist(U_i, H_n)]^T}{\alpha}\right),$$

$U_i$ is original image, $H_n$ represents the vector of the encoding dictionary, n represents the number of elements in the encoding dictionary, α is the weight coefficient of the local adapter, dist($U_i$,$H_n$) represents the Euclidean distance between $U_i$ and $H_n$, $dd_{w_i}$ represents a local adapter; the saliency image $p_g(w_i)$ of salient target is as follows:

$$P_g(w_i) = \|U_i - Dbb_i\|^2$$

The beneficial effect of the invention is as follows: The invention apply GBVS model to extract the saliency image preliminarily; Then, we use the method of spectral scale space of hypercomplex frequency domain to extract the global features which can combine the features in time domain and frequency domain; Lastly, we apply the method based on the cues combining the global and the local which can combine the features in the global and the local to make the outline of salient objects clear. The invention can emphasize the salient regions and inhibit the non-salient regions to extract the salient objects accurately.

SPECIFIC IMPLEMENTATION METHODS

The following will be explained further with the accompanying drawings, but the scope of protection of this invention is not limited to this.

Figure 1:
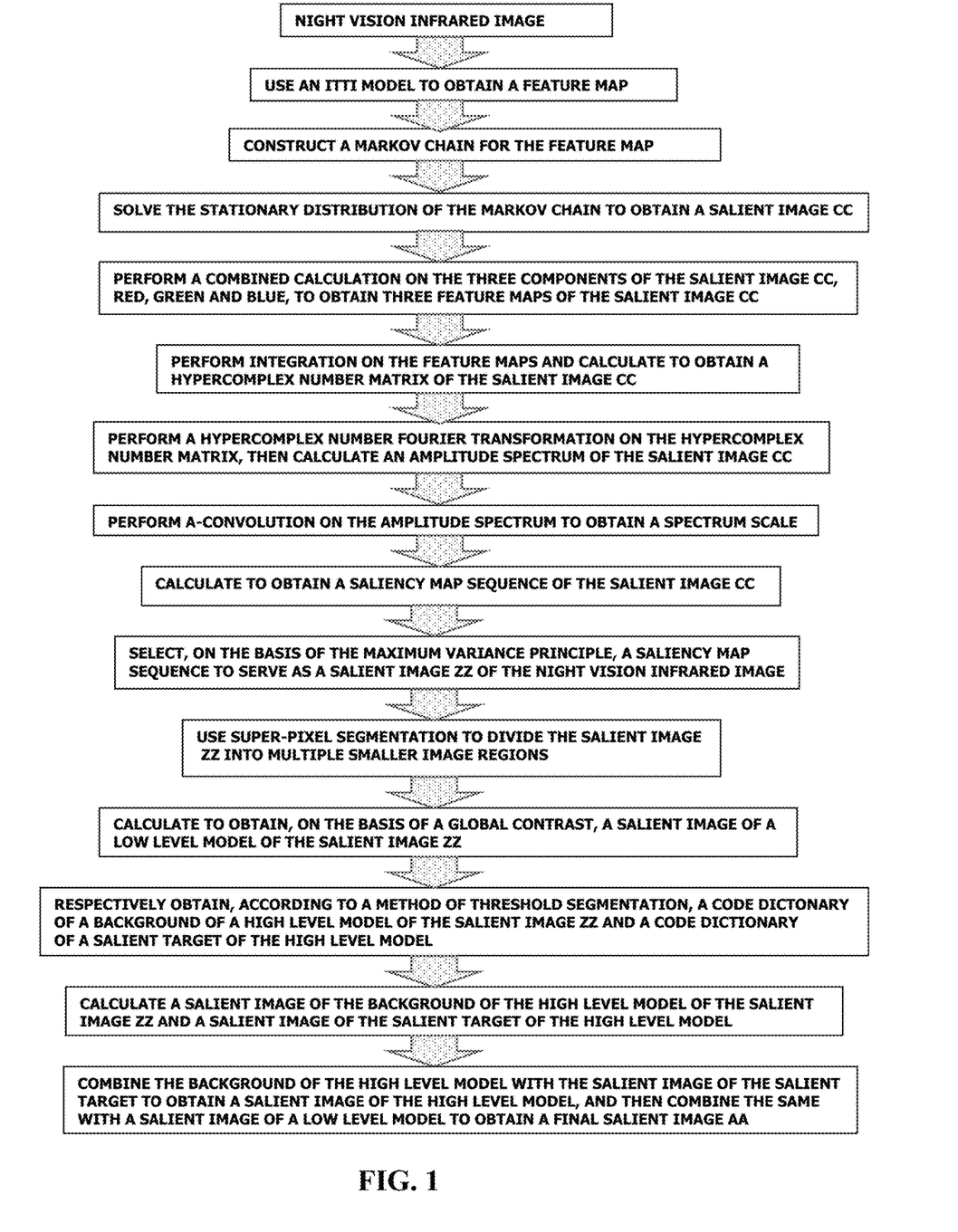
FIG. 1 is a flowchart of the method to extract the road targets based on the saliency in the infrared image in night vision.

As shown in FIG. 1, the flowchart of the method to extract the road targets based on the saliency in the infrared image in night vision contains the following steps:

S1, For night vision infrared image, we use the GBVS model to extract the salient region based on local features to salient image CC after rough extraction;

S1.1, We use the classic ITTI visual saliency model (saliency model based visual attention) to extract the feature map of night vision infrared images;

S1.2, Markov chain of the feature map can be constructed by Markov random field;

Markov random field: the saliency of pixels in an image cell region is only related to the saliency of the adjacent pixels, but has nothing to do with the saliency of other pixels, then the set of pixels in this small image region is a Markov random field;

S1.3, By finding the equilibrium distribution of Markov chains, we get the saliency image CC.

S2, Based on the method of spectral scale space of the hypercomplex frequency domain (applying the hypercomplex Fourier transformation to transform from time domain to spectral scale space in hypercomplex frequency domain), extract the salient region meticulously of salient image CC to get the salient image ZZ of night vision infrared image in the global feature;

S2.1, By calculating the three components in red, green and blue channels of saliency image, three characteristic maps U,RG,BY of saliency image are obtained. The formula is as follows:

$$U=(r+g+b)/3 \quad (1)$$

$$RG=[r-(g+b)/2]-[g-(r+b)/2] \quad (2)$$

$$BY=[b-(r+g)/2]-[(r+g)/2-|r-g|/2-b] \quad (3)$$

Where: the r, g, b is three components in red, green and blue channels of saliency image CC;

S2.2, Integrate the feature map U,RG,BY and gaining the hypercomplex matrix f(x,y), the Formula is as Follows:

$$f(x,y)=0.5\times U\vec{i}+0.25\times RG\vec{j}+0.25BY\vec{k} \qquad (4)$$

Where: vectors $\vec{i}$, $\vec{j}$, $\vec{k}$ are unit vectors in the three dimensional space coordinate system with the same direction as x, y, z;

S2.3, Carry out the hypercomplex Fourier transformation to the hypercomplex matrix f(x,y), and calculating the amplitude spectrum A, phase spectrum p, and feature spectrum kk, the formula of amplitude spectrum A is as follows:

$$A=|F(f(x,y))| \qquad (5)$$

Where: |•| is calculating the amplitude, F( ) is hypercomplex Fourier transformation;

S2.4, Make convolution on the amplitude spectrum A to obtain spectral scale space $\{AA_k\}$, and its formula is as follows:

$$\{AA_k\}=g*A \qquad (6)$$

Among them, g is Gaussian kernel, * is convolution.

S2.5, Calculate the salient map sequence $\{Z_k\}$ based on the spectral scale space $\{AA_k\}$, the formula is as follows:

$$Z_i=g*|F^{-1}\{AA_k(x,y)e^{kk\times p(x,y)}\}|^2 \qquad (7)$$

phase spectrum p is as follows:

$$p=\varphi(F(f(x,y))) \qquad (8)$$

And feature spectrum kk is as follows:

$$kk = \frac{v(F(f(x,y)))}{\|v(F(f(x,y)))\|} \qquad (9)$$

Among them, g is gaussian kernel, ⊕ is convolution, *is product, $F^{-1}$ is Fourier inversion, |•| is solving amplitude; F( ) is hypercomplex Fourier transformation; $\varphi$( ) is phase; v( ) is taking the vector part of the Fourier transformation; ||•|| is the modulus of vector;

S2.6, Select one of saliency image ZZ from saliency map sequence $\{Z_i\}$ based on the principle of maximum variance.

Figure 2:
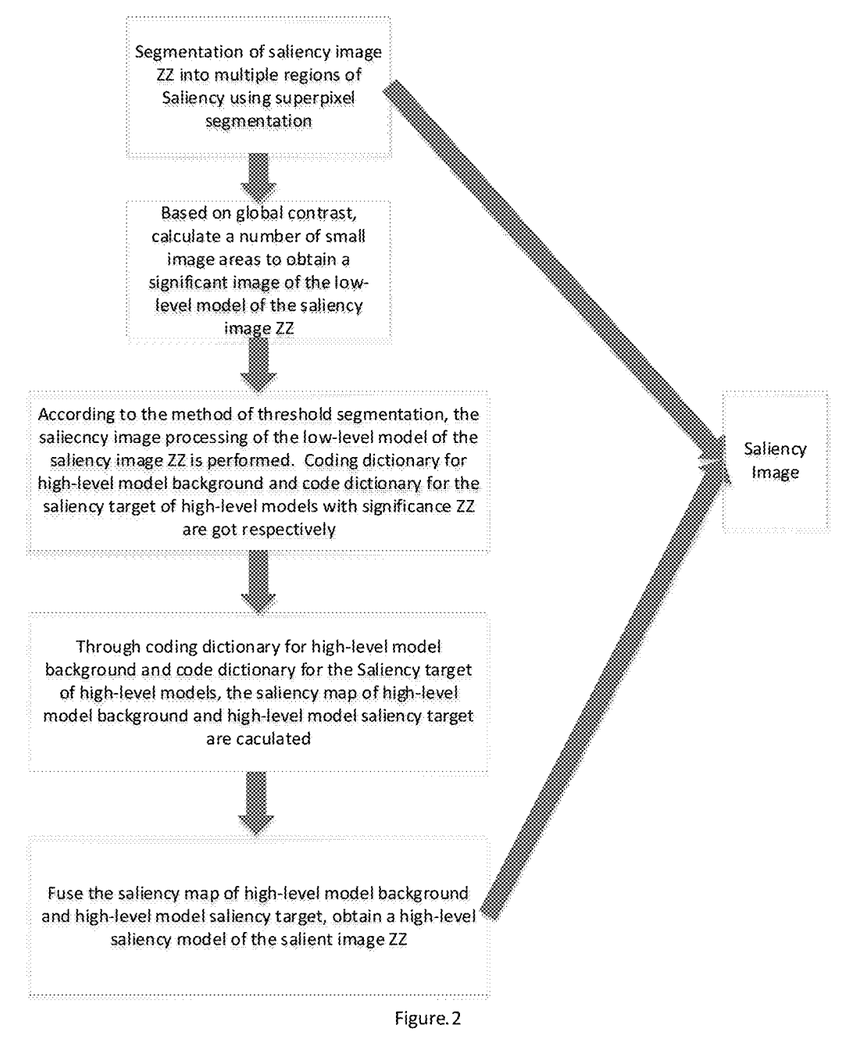
FIG. 2 is a flowchart based on the integration of the global and local cues for the saliency extraction method.

S3, As shown in FIG. 2, for the saliency image ZZ, we use the saliency extraction method based on the fusion of global and local cues to integrate the global and local cues of the saliency image ZZ, and get the saliency image AA;

S3.1, Saliency image ZZ is divided into several small image regions based on the super pixel segmentation (super pixel segmentation is the method to extract the region whose pixel is similar in position, color, brightness and texture).

S3.2, For the multiple small image regions in S3.1, the global contrast is used to obtain the salient image in the low level model of saliency image ZZ. The calculation to multiple small images based on the global contrast is as follows:

$$OK(w_i) = \frac{\sum_{q \in w_i} OK(q)}{N_{w_i}} \qquad (10)$$

Among them, OK(q) indicates the frequency of the pixels q falling within the salient target region, $W_i$ represents multiple small image areas separated by super-pixel segmentation, $N_{w_i}$ indicates the number of pixels that fall into the region $w_i$;

$$CK(w_i) = \exp\left[-\frac{(x-x_o)^2}{2V_x^2} - \frac{(y-y_o)^2}{2V_y^2}\right] \qquad (11)$$

Among them, (x,y) is average coordinates; $(x_0,y_0)$ is image central coordinates; $V_x$, $V_y$ is width and height of the image parameters;

The saliency map $P_d$ ($w_i$) of the low-level model is obtained as follows according to the above formula:

$$P_d(w_i) = \frac{\sum_{j=1}^{M} dd(w_i, c_j)}{M} \times OK(w_i) \times CK(w_i) \qquad (12)$$

Among them, $c_j$ is small image area located on the image boundary; M represents the number of small image areas in the image boundary; dd ($w_i$,$c_j$) represents the difference between the region $w_i$ and region $c_j$ measured by Euclidean metric; $P_d(w_i)$ is salient map of low-level model;

S3.3, According to the saliency image ZZ in the low level model, we get the coding dictionary BC of the background and the coding dictionary FC of the salient target in the high-level model based on the threshold segmentation method (make segmentation to the image based on threshold); principle in threshold segmentation of coding dictionary BC of the background and the coding dictionary FC of the salient target in the high-level model is: BC=$w_i$ (if $P_d(w_i)<\lambda_1$), FC=$w_i$ (if $P_d(w_i)>\lambda_2$), Among them, $\lambda_1$ represents the threshold selected in the background encoding; $\lambda_2$ is threshold value chosen for the encoding of a salient target;

S3.4, The calculation of the saliency image of background and the saliency image of salient target in high-level model of the saliency image ZZ is as follows:
the equilibrium coefficient µ between punitive consideration and regularization is selected randomly by computer to satisfy the following formula:

$$\min\left(\sum_{i=1}^{n} \|U_i - Dbb_i\|^2 + \mu\|dd_{w_i} \circ bb_i\|^2\right), \qquad (13)$$

Where $U_i$ is description to the infrared image of night vision, D is the Coding dictionary, ° is product of elements;

$$bb_i = \frac{1}{cc_i + \lambda \times tr(cc_i)} \qquad (14)$$

Where $cc_i$ is covariance matrix, $\lambda$ is Regularization coefficient, X is product, $tr(cc_i)$ is the sum of diagonal elements in a matrix $cc_i$;

$$dd_{w_i} = \exp\left(\frac{[dist(U_i, H_1), dist(U_i, H_2) \ldots dist(U_i, H_n)]^T}{\alpha}\right) \qquad (15)$$

Where $H_n$ represents the vector of the encoding dictionary, n represents the number of elements in the encoding dictionary, $\alpha$ is the weight coefficient of the local adapter, dsit($U_i$,$H_n$) represents the Euclidean distance between $U_i$ and $H_n$;

According to the above formulas, the saliency image $p_g(w_i)$ of salient target in the high-level model is as follows:

$$P_g(w_i) = \|U_i - Dbb_i\|^2 \qquad (16)$$

S3.5, Combine the saliency image of the salient target and background to get the saliency image of the high level model;

S3.6, Fuse the saliency image of the low level model and the saliency image of the high level model to get the final salient image AA.

Figure 3:
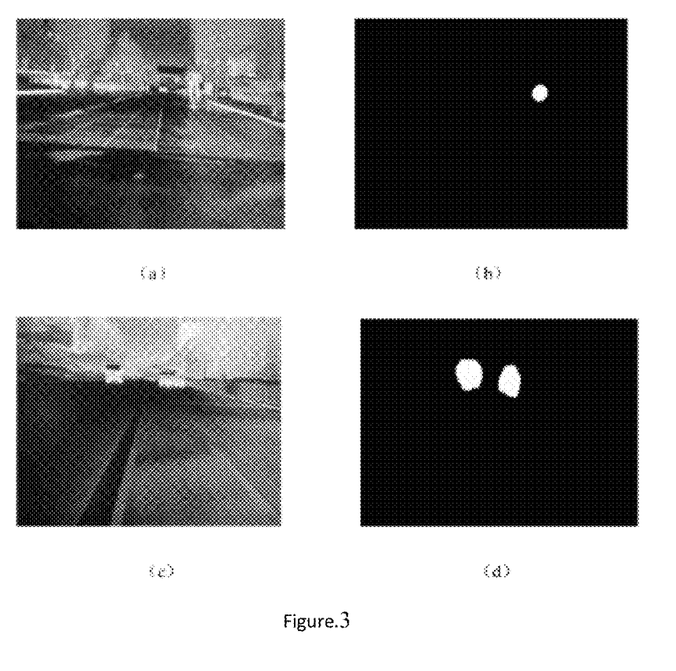
FIG. 3 saliency map in the invention, FIG. 3(*a*) is the infrared image in night vision of pedestrian, FIG. 3(*b*) is the saliency map of pedestrian in the invention, FIG. 3(*c*) is the infrared image in night vision of vehicle, FIG. 3(*d*) is the saliency map of vehicle in the invention.

The saliency image of pedestrian and vehicle are obtained by the method to extract the road targets based on the saliency in the infrared image in night vision of the invention as shown in FIG. 3.

The example is a preferred embodiment of the invention, but the invention is not limited to the above implementation. Without deviating from the substance of the invention, any obvious improvement, replacement, or deformation that the technical personnel of the field made still belong to the scope of protection of the invention.

The invention claimed is:

1. A method to extract road targets based on saliency in an infrared image using night vision, contains the following steps:

capturing a night vision infrared image of a road target;

performing a coarse extraction on a saliency region of the night vision infrared image based on local contrast using a graph-based visual saliency model to obtain a saliency image CC;

performing an extraction of the saliency region of the saliency image CC using a hypercomplex Fourier transformation on global features of the saliency image CC to transform a time domain of the saliency image CC to a spectral scale space with a hypercomplex frequency domain to form a saliency image ZZ; and fusing global and local cues to get a saliency image AA;

wherein the saliency image CC is a first saliency image of the night vision infrared image, the saliency image ZZ is a second saliency image of the night vision infrared image, and the saliency image AA is a final saliency image of the night vision infrared image;

wherein forming the saliency image ZZ comprises:

using a red component, a green component, and a blue component of the saliency image CC to calculate characteristic maps U, RG, and BY;

wherein 'r' is the red component, 'g' is the green component, and 'b' is the blue component; and wherein U is calculated by U=(r+g+b)/3, RG is calculated by RG=[r−(g+b)/2]−[g−(r+b)/2], and BY is calculated by BY=[b−(r+g)/2]−[(r+g)/2−|r−g|/2−b];

using the characteristic maps U, RG, and BY to create a hypercomplex matrix f(x,y) of the saliency image CC;

performing a hypercomplex Fourier transformation of the hypercomplex matrix f(x,y), wherein an amplitude spectrum A, a phase spectrum p, and a characteristic spectrum kk are calculated;

performing a convolution calculation on the amplitude spectrum A to obtain a spectral scale space $\{AA_k\}$;

calculating a saliency map sequence $\{Z_k\}$ of the saliency image CC based on the spectral scale space $\{AA_k\}$; and selecting the saliency image ZZ from the saliency map sequence $\{Z_k\}$ based on the principle of maximum variance, wherein the saliency image ZZ is one of the saliency maps from the saliency map sequence $\{Z_k\}$.

2. According to the method to extract the road targets based on the saliency in the night vision infrared image according to claim 1, it is characterized that the steps to combine global cues and local cues to get a saliency image AA comprise:

dividing the saliency image ZZ into multiple small image regions based on a super pixel segmentation;

using a global contrast on the multiple small image regions to calculate a low level model of the saliency image ZZ;

using the low level model of the saliency image ZZ, to create a coding dictionary BC of a background and a coding dictionary FC of the saliency region in a high-level model of saliency image ZZ, based on a threshold segmentation method;

calculating a saliency image of the background and a saliency image of the saliency region in the high-level model of the saliency image ZZ;

combining the saliency image of the saliency region and the saliency image of the background to get the saliency image of the high-level model of the saliency image ZZ; and fusing the saliency image of the low level model of the saliency image ZZ and the high-level model of the saliency image ZZ to get the final saliency image AA.

3. According to the method to extract the road targets based on the saliency in the night vision infrared image according to claim 2, it is characterized by:

using the threshold segmentation method of the coding dictionary BC of the background and the coding dictionary FC of the saliency region in the high-level model;

wherein BC=$w_i$ (if $P_d(w_i)<\lambda_1$), FC=$w_i$ (if $P_d(w_i)>\lambda_2$); and wherein $\lambda_1$ represents a threshold selected in a background encoding and $\lambda_2$ is a threshold value chosen for an encoding of the saliency region;

wherein $P_d(w_i)$ is saliency map of the low-level model of the saliency image ZZ determined by $$P_d(w_i) = \frac{\sum_{j=1}^{M} dd(w_i, c_j)}{M} \times OK(w_i) \times CK(w_i);$$

wherein $$OK(w_i) = \frac{\sum_{q \in w_i} OK(q)}{N_{w_i}},$$

OK(q) indicates a frequency of pixels q falling within the salient region, $w_i$ represents multiple small image areas separated by super-pixel segmentation, $N_{w_i}$ indicates the number of pixels that fall into the salient region;

wherein $$CK(w_i) = \exp\left[-\frac{(x-x_o)^2}{2V_x^2} - \frac{(y-y_o)^2}{2V_y^2}\right],$$

(x,y) are average coordinates; $(x_o,y_o)$ is an image central coordinate; $V_x$, $V_y$ is a width and a height parameter of the saliency image ZZ; and wherein $$P_d(w_i) = \frac{\sum_{j=1}^{M} dd(w_i, c_j)}{M} \times OK(w_i) \times CK(w_i),$$

$c_j$ is a small image area located on an image boundary; M is the number of small image areas within the image boundary; $dd(w_i,c_j)$ represents the difference between the region $w_i$ and region $c_j$ measured by a Euclidean metric.

4. According to the method to extract the road targets based on the saliency in the night vision infrared image according to claim 2, it is characterized by:
    calculating the saliency image of the background and the saliency image of the saliency region in the high-level model of saliency image ZZ;
wherein an equilibrium coefficient between a punitive consideration and a regularization is selected randomly by a computer to satisfy the following formula:

$$\min\left(\sum_{i=1}^{n} \|U_i - Dbb_i\|^2 + \mu\|dd_{w_i} \circ bb_i\|^2\right);$$

wherein $U_i$ is a description of the night vision infrared image, D is a coding dictionary, $\circ$ is a product of elements; wherein $$bb_i = \frac{1}{cc_i + \lambda \times tr(cc_i)},$$

$cc_i$ is a covariance matrix, $\lambda$ is a regularization coefficient, x is a product, and $tr(cc_i)$ is a sum of diagonal elements in a matrix $cc_i$; wherein $$dd_{w_i} = \exp\left(\frac{[dist(U_i, H_1), dist(U_i, H_2) \ldots dist(U_i, H_n)]^T}{\alpha}\right),$$

$H_n$ represents a vector of the encoding dictionary, n represents a total number of elements in the encoding dictionary, $\alpha$ is a weight coefficient of a local adapter, $dsit(U_i, H_n)$ is a Euclidean distance between $U_i$ and $H_n$; and
    wherein and the saliency image $P_g(w_i)$ of saliency region in the high-level model is $P_g(w_i)=\|U_i-Dbb_i\|^2$.

5. According to the method to extract the road targets based on the saliency in the night vision infrared image according to claim 1, characterized by:
    the formula to calculate the hypercomplex matrix f(x,y);
    wherein $f(x,y)=0.5\times U\vec{i}+0.25\times RG\vec{j}+0.25BY\vec{k}$; and
    wherein vectors $\vec{i}$, $\vec{j}$, $\vec{k}$ are unit vectors; and
    wherein the vector $\vec{i}$ corresponds to a first dimensional direction, the vector $\vec{j}$ corresponds to a second dimensional direction, and the vector $\vec{k}$ corresponds to a third dimensional direction of a three dimensional coordinate space.

6. According to the method to extract the road targets based on the saliency in the night vision infrared image according to claim 1, characterized by:
    the formula to calculate the amplitude spectrum A;
    wherein A=|F(f(x,y))|; and
    wherein: |•| is calculating an amplitude, and FO is the hypercomplex Fourier transformation.

7. According to the method to extract the road targets based on the saliency in the night vision infrared image according to claim 1, characterized by:
    the formula to calculate saliency map sequence $\{Z_k\}$;
    wherein $Z_i=g*|F^{-1}\{AA_k(x,y)e^{kk\times p(x,y)}\}|^2$; and
    wherein a phase spectrum is P=φF(f(x,y))), a feature spectrum is $$kk = \frac{v(F(f(x, y)))}{\|v(F(f(x, y)))\|},$$

g is a gaussian kernel,* is a convolution calculation, x is a product, $F^{-1}$ is a Fourier inversion, |•| is solving an amplitude; F( ) is a hypercomplex Fourier transformation; φ( ) is a phase; v( ) is a vector part of the hypercomplex Fourier transformation; and ‖•‖ is a modulus of the vector.

* * * * *

UNITED STATES PATENT AND TRADEMARK OFFICE
CERTIFICATE OF CORRECTION

PATENT NO. : 10,635,929 B2
APPLICATION NO. : 16/070078
DATED : April 28, 2020
INVENTOR(S) : Cai et al.

Page 1 of 1

It is certified that error appears in the above-identified patent and that said Letters Patent is hereby corrected as shown below:

In the Claims

Column 9, Line 19: Claim 4, Delete "equilibrium coefficient between a punitive" and insert
-- equilibrium coefficient $\mu$ between a punitive --

Column 10, Line 24: Claim 6, Delete "and FO is" and insert -- and $F()$ is --

Signed and Sealed this
Thirtieth Day of June, 2020

Andrei Iancu
*Director of the United States Patent and Trademark Office*